United States Patent Office
3,382,146
Patented May 7, 1968

3,382,146
METHOD OF PROTECTING PLANTS WITH 2,1,3-BENZODITHIADIAZOLE COMPOUNDS
Harmannus Koopman and Albert Tempel, Weesp, Netherlands, assignors to North American Philips Company, Inc., New York, N.Y., a corporation of Delaware
No Drawing. Filed Sept. 11, 1963, Ser. No. 308,088
Claims priority, application Netherlands, Sept. 13, 1962, 283,211
7 Claims. (Cl. 167—33)

ABSTRACT OF THE DISCLOSURE

Nitrobenzothiadiazoles 2,1,3 and halonitrobenzothiadiazoles 2,1,3 such as 5-nitro-4,6,7-trichlorobenzthiadiazole 2,1,3 and 4,6-dinitrobenzthiadiazole-2,1,3. These compounds are useful as plant fungicides. This abstract is not intended to be a description of the invention defined by the claims.

It has been found that nitrobenzthiadiazoles and especially halogennitrobenzthiadiazoles have a fungicidal activity such that these compounds are suitable as the active ingredients in compositions for combating moulds, especially moulds on living plants.

The invention relates to a composition for combating moulds comprising as an active ingredient a nitro- or nitrohalogen benzthiadiazole and especially a compound of the formula

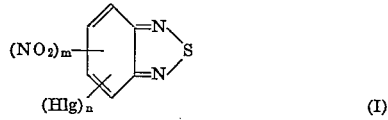

or of the formula

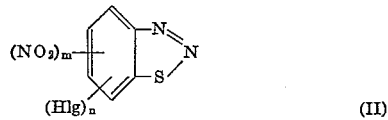

where H$lg$ represents a halogen atom and preferably chlorine or bromine, while $m=1$ or 2, $n=0$ to 3 and $m+n=2$ to 4.

Especially compounds of the Formula I are suitable as the active ingredients.

The fungicidal activity of the compounds was determined, for example, with respect to *Fusarium culmorum* and *Venturia inaequalis* by spore germination tests, with respect to *Phytophthora infestans* on tomatoes in a so-called leaf test and with respect to barley and cucumber mildew (Erysiphaceae). The activity against *Venturia inaequalis* (apple-scab) and *Phytophthora infestans* was also tested in field tests.

These tests showed that especially nitrobenzthiadiazoles which contain, in addition to one or more nitro-groups, chlorine or bromine, have a satisfactory fungitoxic activity, particularly those compounds according to Formula I in which the ratio between the number of these halogen atoms and that of the nitro-groups is 1:1 or 2:1. In spore germination tests with *Fusarium culmorum* and *Venturia inaequalis* these compounds produced a germination retardation of at least 95% even in a concentration of only $10^{-6}$ mg./l.

Examples of these compounds are:

4-nitro-5-chlorobenzthiadiazole-2,1,3,
4-nitro-5,6-dichlorobenzthiadiazole-2,1,3,
4-nitro-5,7-dichlorobenzthiadiazole-2,1,3,
5-nitro-4,7-dichlorobenzthiadiazole-2,1,3 and
5-nitro-4,7-dichromobenzthiadiazole-2,1,3.

Compounds of the Formula I in which H$lg$ represents chlorine or bromine and $m=2$ and $n=2$ showed so high an activity in the spore germination tests that even in a concentration of $10^{-7}$ mg./l. a germination retardation of at least 95% was obtained. Examples of these compounds are:

4,7-dinitro-5,6-dichlorobenzthiadiazole-2,1,3,
4,6-dinitro-5,7-dichlorobenzthiadiazole-2,1,3 and
5,6-dinitro-4,7-dichlorobenzthiadiazole-2,1,3.

These compounds also have a satisfactory to highly satisfactory activity against mildew. This applied especially to 5,7-dichloro-4,6-dinitrobenzthiadiazole-2,1,3.

5-nitro-4,6,7-trichlorobenzthiadiazole-2,1,3 has a highly satisfactory activity against barley mildew.

Other examples of compounds in accordance with the invention are 4-nitro-7-chlorobenzthiadiazole-1,2,3, 7-nitro-5-chlorobenzthiadiazole-1,2,3, 4,6-dinitrobenzthiadiazole-2,1,3 and 4,7-dinitrobenzthiadiazole-2,1,3.

For combating moulds on living plants it is naturally of importance that the compositions used do not damage the plants treated, in other words are not phytotoxic.

From said leaf test and field tests it has been found that among the compounds in accordance with the invention those compounds of Formula I in which $m=2$ and $n=2$ are distinguished by a slight phytotoxicity and that this applies especially to 4,7-dihalogen-5-nitrobenzthiadiazoles-2,1,3 and particularly to 4,7-dibromo-5-nitrobenzthiadiazole-2,1,3.

Of the compounds in accordance with the invention a few have been described in the literature (Chem. Abstracts 52, 7292i (1958)).

The compounds in accordance with the invention which have not been described in the literature can be produced in a manner known for the production of such compositions or in an analogous manner and, for example, by nitration of halogen benzthiadiazoles.

A composition in accordance with the invention can be produced in a manner known for the production of such a composition and, for example, according to the methods described hereinafter.

Combating moulds, for example on plants, may be effected in known manner and, for example, by applying to the objects to be treated a composition in accordance with the invention e.g., by dusting or spraying.

The production of a composition in accordance with the invention may be effected by mixing an active ingredient with a solid or liquid inert carrier, if desired with the use of a surface-active substance, a dispersion agent or an adhesive.

A dust may be produced by grinding 2 parts by weight of active ingredient, 10 parts by weight of chalk and 88 parts by weight of dolomite together, for example, to an average particle size of about 10 microns.

A wettable powder may be produced by mixing 20 parts by weight of active ingredient, 75 parts by weight of kaolin, 2 parts by weight of oleylamidomethyltaurate and 3 parts by weight of sodium lignin sulphonate and grinding the mixture of a mean particle size of about 10 microns.

A miscible oil may be produced by mixing 7 parts by weight of active ingredient, 50 parts by weight of acetone, 15 parts by weight of methylethylketone, 23 parts by weight of xylene and 5 parts by weight of a polyoxyethylenesorbitan fatty acid ester. An emulsion is obtained by mixing a miscible oil with water.

A seed disinfectant may be produced by mixing 5 parts by weight of active ingredient, 93 parts by weight of kaolin and 2 parts by weight of an adhesive, for example, spindle oil.

For the production of the said powders and dusts other inert carriers may also be used, for example, chalk and pipe clay; for the production of miscible oils other inert diluents may be used, for example, toluene and cyclohexanone. Other surface-active substances than those referred to may also be used.

What is claimed is:

1. A method of protecting living plants from the attack of fungi comprising treating said plants with a composition containing a fungicidally effective amount of a benzothiadiazole compound selected from the group consisting of

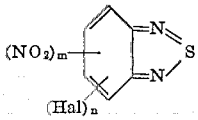

and

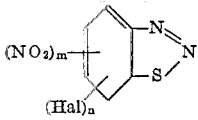

wherein Hal is the group consisting of chlorine and bromine, $m$ is a whole number from 1 to 2, $n$ is a whole number from 0 to 3 and $m+n=2$ to 4.

2. The method of claim 1 wherein the benzothiadiazole compound contains the same number of halogen atoms as nitro groups.

3. The method of claim 1, wherein the benzothiadiazole compound contains twice as many halogen atoms as nitro groups.

4. The method of claim 1 wherein the benzothiadiazole compound is 4,6-dinitro-5,7-dichlorobenzothiadiazole-2,1,3.

5. The method of claim 1 wherein the benzothiadiazole compound is 5,6-dinitro-4,7-dichlorobenzothiadiazole-2,1,3.

6. The method of claim 1 wherein the benzothiadiazole compound is 5-nitro-4,7-dihalobenzothiadiazole-2,1,3.

7. The method of claim 1 wherein the benzothiadiazole compound is 5-nitro-4,7-dibromobenzothiadiazole-2,1,3.

References Cited

UNITED STATES PATENTS 3,279,909  10/1966  Daams et al. _____ 71—2.5

FOREIGN PATENTS 812,512  4/1959  Great Britain.

OTHER REFERENCES

Chem. Abst. vol. 52, p. 7292, 1958.

ALBERT T MEYERS, *Primary Examiner.*

D. R. MAHANAND, G. A. MENTIS,

*Assistant Examiners.*

UNITED STATES PATENT OFFICE
CERTIFICATE OF CORRECTION

Patent No. 3,382,146                        May 7, 1968

Harmannus Koopman et al.

It is certified that error appears in the above identified patent and that said Letters Patent are hereby corrected as shown below:

In the heading to the printed specification, line 3, "BENZODITHIADIAZOLE" should read -- BENZOTHIADIAZOLE --. Column 3, line 27, after "is" insert -- halogen selected from --.

Signed and sealed this 2nd day of December 1969.

(SEAL)

Attest:

Edward M. Fletcher, Jr.

Attesting Officer

WILLIAM E. SCHUYLER, JR.

Commissioner of Patents